United States Patent Office 3,194,796
Patented July 13, 1965

3,194,796
ELASTOMERIC FLUOROCARBON TERPOLYMERS OF VINYLIDENE FLUORIDE, HEXAFLUOROPROPYLENE AND A HALOGEN FREE POLAR MONOMER
Edward Noonan Squire, Birmingham Township, Delaware County, Pa., assignor to E. I. du Pont de Nemours and Company, Wilmington, Del., a corporation of Delaware
No Drawing. Filed Mar. 22, 1962, Ser. No. 181,791
5 Claims. (Cl. 260—80.5)

This invention relates to elastomer surfaced constructions.

In the past, many transparent plastics have been used as substitutes for glass. Generally, these plastics have the advantage over glass that they are more break-resistant, are easier to fabricate, especially where unusual shapes are necessary, and that when broken they do not produce the multitude of dangerous sharp edges found with broken glass. These transparent plastic constructions have had the disadvantages that they are easily scratched, their surfaces soon become marred in use, they discolor, and they deteriorate generally much quicker than glass.

This invention has as an object the forming of a transparent surface which is scratch-resistant, does not discolor, and is extremely durable. A further object is to produce a surface which is suitable for use on a wide variety of substrates. Another object is to provide a surface which does not adversely affect the light transmittance of the surfaced construction.

These objects and others are accomplished by the following invention, which relates to the surfacing of various substrates with a fluorocarbon elastomer. The preferred fluorocarbon elastomers are vinylidene fluoride/hexafluoropropene copolymers, containing from 45 to 85 weight percent vinylidene fluoride, preferably 55 to 75 weight percent, and terpolymers of vinylidene fluoride, perfluoropropylene, and one of the group consisting of methacrylic acid, glycidyl methacrylate, ethylene dimethacrylate, and acrylonitrile.

Examples of formulating these copolymers and terpolymers are given in Table I.

In Table I, $T_B$=tensible strength at break, $E_B$ represents elongation at break, yield is the grams of elastomer produced, secant modulus is the tensile stress to elongate the specimen 100%.

The films tested were made by dissolving the polymer in ethyl acetate to form a solution of from three to four poises, which solution was then poured on a glass plate and allowed to dry at room temperature. The film was then baked at 85° C. for one hour and the tests made. The films tested were from 3 to 4 mils thick.

The elastomers of Examples 1 to 36 have been made into filaments by extruding through a conventional filament extrusion die. The filaments need not be stretched but can be if desired. If the filaments are to be stretched, it is preferred that they be crosslinked. Suitable methods of crosslinking these polymers are hereinafter described.

The viscosities of the compositions of Examples 1 to 36 have been tested. Selected viscosities are given in Table II to illustrate the preferred range of molecular weight. In each case, there are 10 grams of elastomer dissolved in 100 ml. of the particular solvent used. The viscosity in poises was obtained by testing in a Gardner-Holdt bubble viscometer.

The elastomers prepared in accordance with Examples 1 to 36 as set forth in Table I were used to surface molded polymethacrylate resin, polyethylene film, polyethylene terephthalate film, molded polymethyl methacrylate sheet, polymethacrylate cast acrylic resin, glass fiber-reinforced phenol formaldehyde panels, glass fiber-reinforced polyethylene terephthalate panels, alpha-methyl styrene-methyl methacrylate copolymer sheet, bis-phenols and phosgene condensation product, polycarbonate resin, polyvinyl fluoride, polyvinylidene fluoride and copolymers of acrylonitrile and methyl methacrylate. Each of the above substrates surfaced with the fluorocarbon elastomers of Examples 1 to 36 provides a highly scratch-and mar-resistant durable sheet or panel.

The fluorocarbon elastomers of Examples 1 to 36 are preferably applied to the base by dissolving said fluorocarbon elastomer in a solvent and then dip-coating the substrate. Crosslinkable functions such as

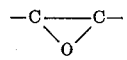

—COOH, etc. may be built into the polymer chain so as to yield an ultimate structure which is solvent-resistant and capable of good bonding to the substrate. The preferred characteristics of the solvent used in the dip-coating operation are that not only must it dissolve the fluorocarbon elastomer, but also that the plastic substrate be slightly soluble in it, although not so soluble under coating conditions as to cause crazing or haze formation. Preferred suitable solvents for use on the above-disclosed suitable substrates with the fluorocarbon elastomers of Examples 1 to 36 are acetone, ethyl acetate, acetic acid, and methyl ethyl ketone, although other low molecular weight esters, aldehydes, organic acids, and ketones may be used. The preferred viscosity of the fluorocarbon elastomer solution should be from about 0.5 to 3 poises. In dip-coating sheets, it has been found desirable to dip-coat an unstretched sheet and then stretch the coated sheet, if possible. So doing provides sheets with better optical qualities, impact resistance, and durability than coating pre-stretched sheets. The above-described dip-coating process is most useful when producing fluorocarbon surfaces from about 0.05 mil to about 15 mils. Fluorocarbon elastomer films about 0.1 to 0.15 mil thick have been found to be particularly desirable. Thicker films of about 9 mils thickness are useful when coarse abrasives are to be encountered, but such thicker surface films generally have to be formed by lamination rather than coating.

The coating operation does not affect the light transmission of any of the substrates. This is surprising since even the vapors of solvents, such as, esters, acids, aldehydes, and ketones, attack substrates such as polyacrylates, and polycarbonates resulting in crazing, cracking, haze formation, and general degradation of the substrate. It is pointed out that these coated substrates actually have improved light transmission over the uncoated substrate. This phenomenon is believed to be due to the lower refractive index of the polyfluorohydrocarbon derivative coat- Table I

| Example No. | Hexafluoropropylene (g.) | Vinylidene Fluoride | Other Monomer (g.) | $(NH_4)_2S_2O_8$ (g.) | Water (ml.) | Other ingredients | Temp., °C. | Pressure (p.s.i.) | Time, min. | Yield (g.) | $T_B$ (p.s.i.) | $E_B$ (percent) | Secant Modulus 100 percent (p.s.i.) | Wt. percent $VF_2$ |
|---|---|---|---|---|---|---|---|---|---|---|---|---|---|---|
| | | | | | | | | | | | Room Temperature Film Tensile characteristics | | | |
| 1 | 48 | 48 | 0.1 methacrylic acid | 0.5 | 160 | | 82 | 1,050 | 130 | 39.7 | 1,540 | 721 | 348 | 53.2-54.8 |
| 2 | 35 | 35 | 0.05 methacrylic acid | 0.5 | 160 | | 80 | 900 | 125 | 42 | 994 | 825 | 127 | |
| 3 | 48 | 48 | 0.2 methacrylic acid | 0.5 | 160 | | 79 | 122 | 153 | 70 | 1,142 | 534 | 350 | |
| 4 | 48 | 48 | 0.4 methacrylic acid | 0.5 | 160 | | 78 | 1,500 | 157 | 63 | 1,670 | 442 | 182 | |
| 5 | 48 | 48 | 0.1 methacrylic acid | 0.5 | 160 | The $H_2O$ sat. at 23° C. with $Na_2SO_4$. | 77 | 1,500 | 330 | 35.9 | 3,310 | 630 | 821 | |
| 6 | 48 | 48 | 0.5 methacrylic acid | 0.5 | 160 | do | 78 | 1,325 | 220 | 24.5 | 3,000 | 586 | 1 677 | |
| 7 | 48 | 48 | | 0.5 | 160 | do | 78 | 1,100 | 217 | 24.5 | 1,350 | 645 | | |
| 8 | 48 | 48 | 1.0 glycidyl methacrylate | 1.0 | 160 | | 75 | 1,100 | 180 | 16.7 | 3,080 | 714 | 1,132 | |
| 9 | 55 | 40 | 2.0 glycidyl methacrylate | 0.5 | 160 | {2 g. $Na_2HPO_4$ {2 g. $Na_2HPO_4$ | 75 | 1,000 | 120 | 9.7 | 620 | 655 | 1,145 | |
| 10 | 48 | 48 | 1.0 ethylene dimethacrylate | 0.5 | 160 | The $H_2O$ sat. at 23° C. with $Na_2SO_4$. | 76 | 1,230 | 300 | 12.4 | 1,060 | 428 | 1 434 | |
| 11 | 48 | 48 | 0.4 glycidyl methacrylate | 0.5 | 160 | 2 g. $Na_2HPO_4$ | 75 | 1,025 | 170 | 49.4 | 1,515 | 807 | 154 | |
| 12 | 55 | 40 | 0.3 glycidyl methacrylate | 0.5 | 160 | 2 g. $Na_2HPO_4$ | 75 | 900 | 385 | 18.9 | | | | |
| 13 | 48 | 48 | 0.2 glycidyl methacrylate | 0.5 | 160 | 2 g. $Na_2HPO_4$. The $H_2O$ sat. at 23° C. with $Na_2SO_4$. | 75 | 1,050 | 350 | 8.1 | | | | |
| 14 | 48 | 48 | 0.4 acrylonitrile | 0.5 | 160 | | 75 | 1,000 | 340 | 65.9 | 945 | 682 | 255 | |
| 15 | 48 | 48 | 0.4 methacrylic acid | 0.5 | 160 | | 75 | 1,050 | 360 | 68.8 | 1,440 | 738 | 251 | |
| 16 | 48 | 48 | | 0.5 | 160 | | 75 | 1,100 | 100 | 56.1 | 1,220 | 740 | 288 | |
| 17 | 48 | 48 | 0.2 glycidyl methacrylate | 0.5 | 160 | | 75 | 1,050 | 180 | 74.2 | 1,770 | 727 | 302 | |
| 18 | 60 | 40 | | 0.5 | 160 | | 75 | 1,100 | 50 | 10 | 2,060 | 761 | 357 | |
| 19 | 45 | 45 | | 0.5 | 160 | 0.3 g. ammonium perfluoronononate | 75 | 1,000 | 70 | 14 | 1,445 | 654 | 320 | 57.5-59.5 |
| 20 | 10 | 10 | | 0.5 | 160 | 0.3 ammonium perfluorononoate | 75 | 675 | 130 | 30.3 | 62.7 | 2,220 | 5.8 | 57.5-59.0 |
| 21 | 80 | 20 | | 0.5 | 160 | do | 75 | 700 | 130 | 73.0 | 42.3 | 2,220 | 9.2 | 38.2-40.5 |
| 22 | 55 | 45 | | 0.5 | 160 | do | 75 | 1,000 | 49 | 77.5 | 1,380 | 650 | 338 | 59.0-60.5 |
| 23 | 40 | 40 | | 0.5 | 160 | do | 75 | 1,000 | 70 | 7.5 | 1,384 | 740 | 287 | 58 |
| 24 | 20 | 20 | 0.5 methacrylic acid | 0.2 | 160 | do | 75 | 650 | 300 | 66.5 | 125 | 2,220 | 108 | |
| 25 | 80 | 60 | | 0.3 | 160 | do | 75 | 875 | 70 | 23.3 | 893 | 1,028 | 137 | 57 |
| 26 | 60 | 60 | | 0.3 | 160 | do | 75 | 1,150 | 15 | 26.5 | 3,160 | 640 | 746 | 76 |
| 27 | 60 | 40 | | 0.3 | 160 | do | 75 | 1,100 | 15 | 6.5 | 1,870 | 631 | 385 | |
| 28 | 70 | 30 | | 0.2 | 160 | do | 75 | 900 | 15 | 0.645 | 2,020 | 515 | 358 | 71.2 |
| 29 | 40 | 30 | | 0.3 | 160 | do | 75 | 1,200 | 15 | 43.0 | (Mud cracks when cast) | | | |
| 30 | 50 | 50 | 0.1 t-butyl alcohol | 0.3 | 160 | do | 75 | 1,300 | 15 | 62.7 | 2,230 | 536 | 688 | |
| 31 | 50 | 50 | 0.2 t-butyl alcohol | 0.3 | 160 | do | 75 | 1,100 | 15 | 25.1 | 1,350 | 700 | 960 | 62.0-64.2 |
| 32 | 50 | 50 | 0.2 methyl alcohol | 0.3 | 160 | do | 75 | 1,100 | 15 | 31.4 | 3,350 | 609 | 1,190 | 77.7 |
| 33 | 50 | 50 | 0.4 methyl alcohol | 0.2 | 160 | do | 75 | 1,400 | 15 | 39.8 | 2,410 | 556 | 607 | 77.2 |
| 34 | 70 | 30 | 0.2 methyl alcohol | 0.3 | 160 | do | 75 | 1,425 | 15 | 5.65 | 3,980 | 752 | 771 | |
| 35 | 75 | 75 | | 0.2 | 160 | do | 75 | (²) | 15 | 27.2 | | 474 | | 74 |
| 36 | 50 | 50 | 0.05 t-butyl alcohol | 0.2 | 160 | do | 75 | (²) | 15 | | 5,480 | | 2,370 | 83 |

¹ After stretching 130%.
² Autogenous pressure.

Table II

| Elastomer of Example | Solvent | Viscosity in poises at 24° C. |
|---|---|---|
| 1 | Ethyl acetate | 0.85 |
| 2 | Tetrahydrofuran | 0.7 |
| 3 | ...do... | 1.40 |
| 4 | ...do... | 4.40 |
| 24 | Ethyl acetate | 0.65 |
| 25 | ...do... | 3.7 |
| 26 | ...do... | 2.25 |
| 28 | ...do... | 1.75 |
| 30 | ...do... | 6.0 |
| 31 | ...do... | 5.0 |
| 34 | ...do... | 2.9 | ing as compared with the substrate. Four inch square, 125 mils thick samples of uncoated "Plexiglas" II, Rohm and Haas acrylic sheet, were tested for light transmittance both before and after 500 hours' exposure in an XW Atlas Weather-Ometer. The Weather-Ometer used a two-hour cycle, consisting of 102 minutes dry at from 140° to 150° F., and 18 minutes wet at 90° C. with a filtered carbon arc light source. The fluorocarbon elastomer surfaced "Plexiglas" was also a four inch square sample, 125 mils thick. The fluorocarbon used was that of Example 23 and was applied in the form of a 1.5 poise acetone solution, and the coating was 0.65 mil thick. The light transmittance was tested according to ASTM Test D–791. The results in terms of percent light transmittance of three runs are reported in Table III.

Table III

| Run | Uncoated | | Fluorocarbon elastomer coated | |
|---|---|---|---|---|
| | Starting material | 500 hours exposure | Starting material | 500 hours exposure |
| 1 | 92.8 %T | 92.6 %T | 95 %T | 92.4 %T |
| 2 | 92.7 %T | 92.4 %T | 95 %T | 92.7 %T |
| 3 | 92.7 %T | 92.5 %T | 95 %T | 92.9 %T |

%T equal percent light transmittance.

The abrasive resistance of the fluorocarbon elastomer surfaces of the present invention have been tested and compared with other plastic surfaces as shown in Table IV. In these tests a 3½ inch disk covered with cheesecloth rotating at 200 r.p.m. under 0.1 p.s.i. pressure was used with a conventional household abrasive cleanser having a maximum abrasive particle diameter of 7 mils.

Table IV

| Material | Gloss retention after scouring for— | | |
|---|---|---|---|
| | 1 min. | 10 min. | 100 min. |
| Fluorocarbon elastomer surfaced acrylic resin sheet, percent | 100 | 100 | 100 |
| Fluorocarbon elastomer surfaced polycarbonate resin sheet, percent | 100 | | |
| Molded acrylic resin sheet, percent | 58 | 54 | 60 |
| Polycarbonate resin sheet, percent | 75 | | |

Table V illustrates the increased impact resistance obtained when representative fluorocarbon surfaced substrates have been stretched. Table V also illustrates that the coating operation does not impair the impact resistance, or stretchability of the sheets. This is in contrast to what might be expected since many plastic surfaces including methacrylate polymers craze, lose their impact resistance, and cannot be stretched after being contacted with any one of an aldehyde, an ester, a ketone, or a lower organic acid.

Table V

| Substrate | | Surface | | Construction | Impact test height,[1] inches | Results |
|---|---|---|---|---|---|---|
| Material | Thickness, mils | Material | Thickness, mils | | | |
| "Lucite" 129 acrylic resin | 155 | Fluorocarbon elastomer | 0.1 | Dip-coated | 9 | No mar. |
| Do | 155 | Glass | 6 | Glass cemented to top of "Lucite" 129. | 8.5 | Glass breaks. |
| Do | 155 | Fluorocarbon elastomer | 0.1 | Dip-coated | 16 | Break height. |
| Extruded "Lucite" methyl methacrylate resin. | [2] 20 | ...do... | 0.1 | Dip-coated dome shaped biaxially oriented cast sheet. | 57 | No mar. |
| Do | [2] 33 | ...do... | 0.1 | (Same as above) | 57 | Do. |
| "Plexiglas" II | 250 | None | | | 58 | Fractures. |
| Do | [2] 28 | Fluorocarbon elastomer | 0.1 | Dip-coated dome shaped biaxially oriented 6.5" x 6.5" sheet. | 57 | No mar. |
| Do | [2] 53 | ...do... | 0.1 | (Same as above) | 57 | Do. |

[1] Specimens were three inch squares (except where noted) mounted horizontally on a 2 inch diameter metal pipe. A one half pound steel ball was dropped vertically on the center of the specimen from the designated height at room temperature.
[2] Stretched from 125 mils.

In addition to the results of this test, it has been found that when 100 mil sheets of polyester or acrylic resins reinforced with glass fiber are subjected to 3 inch fall tests with a ½ lb. steel ball, there is surface damage. When ink is applied to the side opposite the area struck with the steel ball, there is a capillary flow of the ink along the glass fibers at the damage site. When such a glass fiber reinforced polyester or acrylic sheets is surfaced with thin fluorocarbon elastomer films, the film remains as an integral and homogeneous surface even under impacts which cause the glass fibers to separate from the resin at the surface. Because of the outstanding weatherability of the fluorocarbon elastomers, the body of the structure is significantly protected from seepage of moisture through the fibers, which will in the course of weathering lead to deterioraiton of the laminate and ultimate failure. Fluorocarbon-surfaced glass fiber reinforced polyester and acrylic sheets exhibit improved scratch-resistance over similar unsurfaced sheets, as well as protection from impact damage.

The fluorocarbon elastomers of the present invention have been found to be expectionally resistant to weathering. Tests of 2000 hours in a "Weather-Ometer" accelerated weathering device, 1 year Florida weather and several months' exposure to temperate zone weather have brought about no visible effect on substrates surfaced with the fluorocarbon elastomers of this invention.

Surfaced structures of the present invention are resistant to attack by aliphatic hydrocarbons, including gasoline and kerosene, aromatic hydrocarbons including benzene, toluene, and xylene, and alcohols such as methyl alcohol. These surface films can be dissolved in pyridine, acetic acid, low molecular weight esters, and low molecular weight ketones and aldehydes. The solvent resistance can be improved by crosslinking. Such crosslinking can be done by Van de Graaf irradiation, peroxide treatments, or nitrogen fluoride treatments. When using the methacrylic acid/hexafluoropropylene/vinylidene fluoride terpolymer, crosslinking can be brought about by treating a 10% solution of such terpolymer in tetrahydrofuran with 0.1% hexamethylene diamine. Crosslinking takes place during the drying operation, which preferably is carried out at about 80° C.

As can be seen from the foregoing, the fluorocarbon surfaced substrates are particularly useful as substitutes for glass panels where break-resistance is of importance.

I claim:
1. A fluorocarbon elastomer containing from 45 to 85 weight percent vinylidene fluoride, hexafluoropropylene, and 0.05 to 2 weight percent of a monomer selected from the group consisting of acrylonitrile, glycidyl methacrylate, and ethylene dimethacrylate.
2. A fluorocarbon elastomer containing from 55 to 75 weight percent vinylidene fluoride, hexafluoropropylene, and from 0.05 to 2 weight percent of a monomer selected from the group consisting of acrylonitrile, glycidyl methacrylate, and ethylene dimethacrylate.
3. A shaped article of the fluorocarbon elastomer of claim 2.
4. A film of the fluorocarbon elastomer of claim 2.
5. A filament of the fluorocarbon elastomer of claim 2.

References Cited by the Examiner

UNITED STATES PATENTS

| 3,023,187 | 2/62 | Shen Lo | 260—29.6 |
| 3,068,187 | 12/62 | Bolstad et al. | 260—29.6 |
| 3,075,939 | 1/63 | Bauer et al. | 260—29.6 |
| 3,080,347 | 3/63 | Sandberg et al. | 260—80.5 |

FOREIGN PATENTS

| 871,582 | 6/61 | Great Britain. |

JOSEPH L. SCHOFER, *Primary Examiner.*
WILLIAM H. SHORT, *Examiner.*